Sept. 16, 1969  R. C. KELLER ET AL  3,466,942
MULTIPLE RATIO FORCE TRANSFER LEVER MECHANISM
Filed Oct. 16, 1967

INVENTORS
Robert C. Keller, &
William E. Brunsdon
BY
D. D. McGrew
ATTORNEY

United States Patent Office 3,466,942
Patented Sept. 16, 1969

3,466,942
MULTIPLE RATIO FORCE TRANSFER
LEVER MECHANISM
Robert C. Keller, Troy, and William E. Brunsdon, Royal
Oak, Mich., assignors to General Motors Corporation,
Detroit, Mich., a corporation of Delaware
Filed Oct. 16, 1967, Ser. No. 675,455
Int. Cl. G05g 1/04; F16d 49/10; B60t 11/08
U.S. Cl. 74—516                    2 Claims

ABSTRACT OF THE DISCLOSURE

A lever mechanism, especially for vehicle parking brakes, having a fast take-up ratio followed by a high force multiplication ratio. The ratio changes are accomplished by shifting force reaction pivot points on a force transfer lever.

---

The invention relates to a lever mechanism having a range of force transfer movement through a plurality of sequential multiplication ratios, and more particularly to such a lever mechanism utilized as part of a vehicle parking brake system wherein the initial force multiplication is low to permit fast brake take-up, and the final multiplication ratio is high to give a high force multiplication. Such a lever mechanism, when provided as part of a vehicle parking brake system, permits the replacement of a commonly used relatively large parking brake lever with a compact remote mounted lever without sacrificing mechanical advantage. It minimizes travel of the vehicle operator's hand or foot devoted to taking up the lash in the total system by using a reduced ratio. After the brake is in condition for actual braking force application, the lever system changes the effective ratio so that a higher force multiplaction is obtained.

Figure 1:
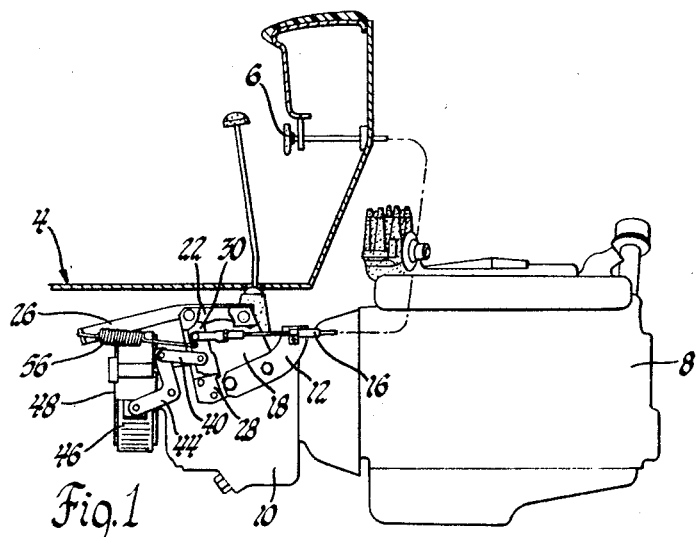
FIGURE 1 is an elevation view of a vehicle having the invention installed as a part of a parking brake system, with some elements being shown schematically and parts of the vehicle illustrated in section.

The vehicle 4 is schematically illustrated as having an operator-operated parking brake control 6 conveniently located in the operator's compartment. The vehicle engine 8 and transmission 10 are also illustrated. The particular installation shown is of a type typically found on trucks, but may be utilized in other types of vehicles. The mechanism embodying the invention is mounted in this instance adjacent the transmission 10. The mounting includes a bracket 12 which has a clip 14 receiving and anchoring the lower end of the parking brake cable assembly 16. The parking brake cable lever plate 18 is also mounted to the transmission 10 by the bolts 20. The plate 18 has a contoured guide plate 22 secured to its upper end by rivets 24. These rivets also secure the spring bracket 26 to the plate 18. The lower corner of the plate 18 has a cable lever lower guide or fulcrum plate 28 secured in place. The cable lever 30, which is a force transfer lever, fits along one side of plate 18 so that its curved upper end 32 engages the contoured guide surface of plate 22, and its contoured lower end 34 engages the fulcrum plate 28. Lever retainers 36 and 38 are respectively positioned adjacent the plate 22 and the fulcrum plate 28 so that they are spaced from plate 18 and hold the lever 30 in place against lateral movement.

Thus when the lever 30 is in the installed position, its movement is limited to a single plane of action. An output member 40 is pivotally secured to the lever 30 at attachment point 42 and is also pivotally secured to one end of the bellcrank lever 44. The other end of the bellcrank lever is illustrated as being attached to the movable end of a parking brake band 46. The brake band surrounds the drum 48, positioned on the vehicle drive shaft, and has its other end anchored by anchor pin 50. Other types of vehicle emergency and parking brake assemblies may be utilized without departing from the scope of the invention. The parking brake tension cable 52 of the cable assembly 16 is pivotally attached at point 54 to the force transfer lever 30. Attachment points 42 and 54 are in spaced relation along the length of lever 30 and intermediate the lever upper end 32 and the lever lower end 34. A tension spring 56 has one end attached at point 58 to the lever 30 and the other end attached to the spring bracket 26 so that the spring is always acting in opposition to a pulling force exerted on the lever by cable 52. Attachment point 58 is intermediate the attachment points 42 and 54.

The contoured guide plate 22 has its contoured surface 60 provided with a socket portion 62 which receives the mating curved upper end 32 of the lever 30. The other portion of the contoured surface 60 is arcuate, with a center located at the center of the projection 64 formed on the fulcrum plate 28 for engagement by the contoured lower end 34 of lever 30. The lever contoured lower end includes a socket-like notch 66 bounded on one side by a projection 68 so that notch 66 normally receives fulcrum plate projection 64, and projection 68 prevents the lever 30 from moving in the leftward direction, as seen in the drawing, beyond this point of engagement. Another notch or pivot section 70 formed as a part of the contoured lower lever end 34 is also engageable with fulcrum plate projection 64, as illustrated in FIGURE 3.

Figure 2:
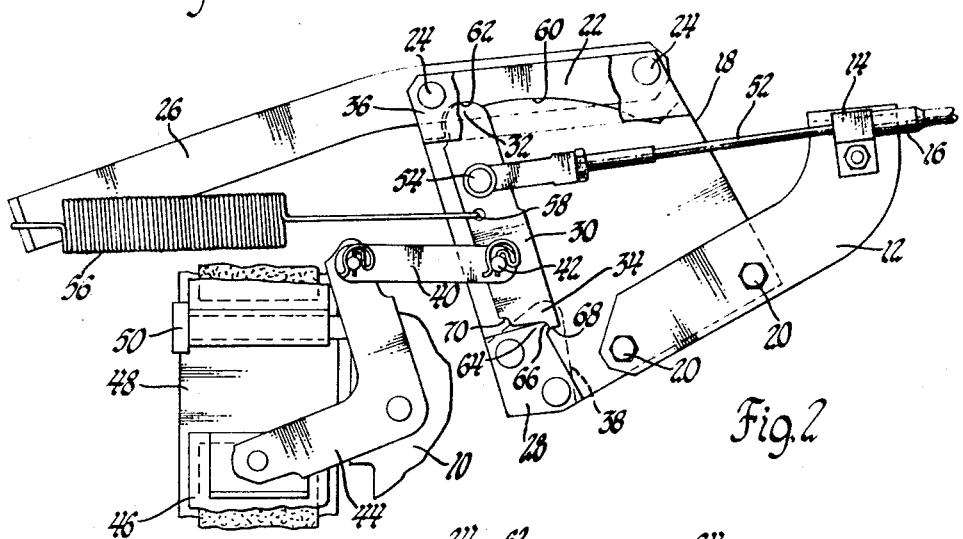
FIGURE 2 is an enlarged view of the lever mechanism of FIGURE 1 embodying the invention and showing the lever mechanism in the parking brake released condition.

When the brake apply mechanism is in the released position shown in FIGURES 1 and 2, the curved end 32 of lever 30 fits within the socket portion 62 of the guide plate 22 and the lever notch 66 on the lower end of lever 30 fits on the projection 64 of the fulcrum plate 28. Spring 56 holds the lever in this position. When it is desired to apply the brake band 46 to the drum 48, the vehicle operator pulls the brake control 6 to tension the cable 52. The force exerted on lever 30 at attachment point 54 causes the lever to pivot about its upper end 32 against the force of spring 56. This also moves the output member 40 to the right as seen in the drawing, pivoting bellcrank lever 44 clockwise and moving the brake band 46 into engagement with the brake drum 48. This action takes up the lash in the total system while utilizing a third class lever relationship between the activated pivot at the upper end 32 of the lever 30 and the input member 52 and the output member 40. By way of example, this force transfer ratio may be on the order of 0.5:1, thereby providing for a fast take-up. Continued increased application of force through tension cable 52 also causes the lever lower end to move away from the fulcrum plate 28 since the lever 30 continues to pivot about its upper end 32. Once the lash has been taken up, resistance to further movement of output member 40 increases rapidly. Thus the attachment point 42 of the output member 40 to the lever 30 becomes a force reaction pivot in a transitory manner, and the guiding action of the contoured surface 60 permits and causes the lever 30 to move in translation downwardly and slightly clockwise about point 42 until the contoured lower lever end 34 engages the projection 64 of fulcrum plate 28. Notch 70 will receive the projection 64, establishing the active force reaction pivot at the lower end of lever 30. In the meantime, the upper end 32 of the lever 30 will be guided by the arcuate portion of the contoured surface 60 so that the relationship of the force transfer lever 30 to the guide plate 22 and the fulcrum plate 28 is that shown in FIGURE 3. In this condition of operation the input member 52 is applying force to the lever 30 at point 54, the force reaction is taking place at the notch 70 of the lever lower end 34, and the force is transferred to the output member 40 at point 42. Therefore the output member 40 is tensioned at a high force multiplication ratio, which may be 2:1, for example, the ratio being defined by the second class lever relationship of the pivotal attachment points 42 and 54 on lever 30 in relation to the notch 70 at the lever lower end. While no upper lever assembly multiplication ratio is shown, since such construction is not part of the invention, a typical upper lever assembly constituting a part of control 6 may have a 5:1 multiplication ratio. Thus the system lash would be taken up through a 2.5:1 ratio and the brake would be applied at a 10:1 ratio should the force transfer lever ratios above noted by way of example be utilized.

Figure 3:
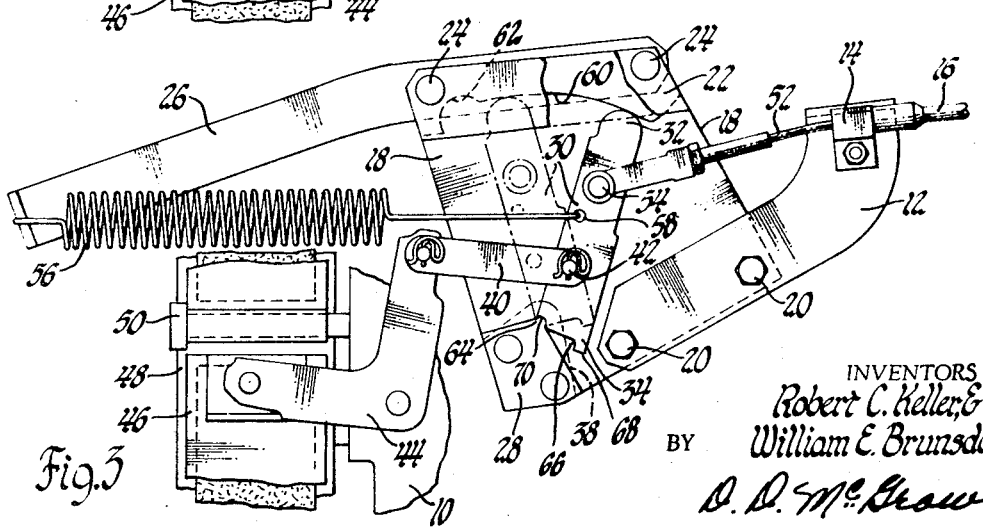
FIGURE 3 is a similar to FIGURE 2, showing the lever mechanism in an intermediate position in dashed lines and a full brake apply position in solid lines.

When the brake is released, spring 56 will move lever 30 counterclockwise as seen in FIGURE 3 about the pivot point established by notch 70 and projection 64. The brake band 46 is also released. The lever upper end 32 again seats in the socket section 62 and the contoured surface of the lever lower end rides on projection 64 until the projection again engages notch 66, and projection 68 prevents further movement of the lever.

What is claimed is:

1. A fast take-up parking brake lever mechanism including a mounting bracket having a contoured guide plate secured thereto and a fulcrum plate also secured thereto in spaced relation to said contoured guide plate, a force transfer lever having one end initially engaging a portion of said contoured guide plate to establish therewith a first force reaction pivot, an input member and an output member pivotally attached to said lever at points intermediate the ends thereof and in relative spaced relation, said input member being connected to operator-operable brake apply means and said output member being operatively connected to a parking brake, the other end of said lever having a contoured surface cooperating with said fulcrum plate to prevent movement of said lever in one direction about the one end thereof beyond a predetermined point and permitting said lever to move arcuately and translationally upon pivoting movement of said lever about said first pivot, said lever contoured surface having a portion engaging a portion of said fulcrum plate after a predetermined amount of such translatory movement to establish therewith a second force reaction pivot at said lever other end, said contoured guide plate having another portion arcuately formed relative to said second pivot and guiding said lever one end during further lever pivoting movement about said second pivot, said input member and output member pivotal attachment points and said lever one end having a relationship whereby force exerted through said input member to said lever to said output member and reacting at said lever one end is transmitted to the parking brake at a fast take-up, low force multiplication ratio, said input member and output member pivotal attachment points and said lever other end having a relationship whereby force exerted through said input member to said output member and reacting at said lever other end is transmitted to the parking brake at a high force multiplication ratio.

2. A lever mechanism having a range of force transfer movement through a plurality of sequential multiplication ratios, said mechanism comprising:

a force transfer lever having a force input member and a force output member respectively pivotally connected therewith and in spaced relation thereon and in force transmitting relation therewith, said force transfer lever further having a plurality of selectively utilized force reaction pivots, and means including a guide plate having a contoured guide surface including a pivot socket initially engaged by one end of said force transfer lever to utilize one of said selectively utilized force reaction pivots, a tension spring attached to said force transfer lever intermediate the points of connection of said input member and said output member with said force transfer lever and urging one end of said force transfer lever toward pivoting engagement with said socket, said means acting within the range of mechanism movement and selectively utilizing said pivots sequentially whereby said mechanism transfers force at the plurality of sequential multiplication ratios from said input member to said output member, said means causing translatory movement of said force transfer lever after a predetermined pivotal movement about said one pivot to remove said one force transfer lever end from said socket and establish another of said pivots of said lever as the utilized pivot, the resistance to movement of said output member upon movement of said input member increasing rapidly after a predetermined amount of output member movement until said output member becomes a transitional force reaction pivot, additional force exerted by said input member then causing movement of said force transfer lever one end out of said pivot socket and along said guide plate contoured surface to control the translatory movement of said lever, said another pivot thereby being established as the utilized pivot at the other end of said force transfer lever for further force reaction.

References Cited

UNITED STATES PATENTS

| | | | |
|---|---|---|---|
| 1,852,286 | 4/1932 | Bragg et al. | 74—516 X |
| 2,230,419 | 2/1941 | White | 74—516 X |
| 2,296,675 | 9/1942 | Jandus | 74—516 |
| 2,588,027 | 3/1952 | McCarthy. | |
| 2,977,817 | 4/1961 | Panasewicz | 74—516 |

FRED C. MATTERN, Jr., Primary Examiner

CAROLYN F. GREEN, Assistant Examiner

U.S. Cl. X.R.

74—512; 188—77